United States Patent [19]

Harréus et al.

[11] Patent Number: 4,481,328

[45] Date of Patent: Nov. 6, 1984

[54] PULVERULENT POLYMER COMPOSITION, A PROCESS FOR ITS PREPARATION AND ADHESIVE BASED THEREON

[75] Inventors: Albrecht Harréus; Eduard Kaiser; Detlev Seip; Wolfgang Zimmermann, all of Kelkheim, Fed. Rep. of Germany

[73] Assignee: Hoechst Aktiengesellschaft, Frankfurt, Fed. Rep. of Germany

[21] Appl. No.: 339,756

[22] Filed: Jan. 15, 1982

[30] Foreign Application Priority Data

Jan. 17, 1981 [DE] Fed. Rep. of Germany ....... 3101413

[51] Int. Cl.$^3$ ............................. C08J 3/12; C08J 5/02; C08K 3/36; C08L 31/04
[52] U.S. Cl. .................................... 524/493; 524/556; 524/563; 524/564; 524/570; 524/904
[58] Field of Search ............... 524/904, 556, 557, 493, 524/563, 564, 570

[56] References Cited

U.S. PATENT DOCUMENTS

| | | | |
|---|---|---|---|
| 3,738,957 | 6/1973 | Iler | 524/557 |
| 3,883,489 | 5/1975 | Matschke et al. | 524/556 |
| 3,907,734 | 9/1975 | Ten Broeck et al. | 524/493 |
| 3,953,487 | 4/1976 | Kratel et al. | 260/448.2 E |

FOREIGN PATENT DOCUMENTS

| | | | |
|---|---|---|---|
| 989533 | 5/1976 | Canada | 400/72 |
| 1206501 | 9/1970 | United Kingdom . | |
| 1569637 | 6/1980 | United Kingdom . | |

*Primary Examiner*—Allan M. Lieberman
*Attorney, Agent, or Firm*—Curtis, Morris & Safford

[57] ABSTRACT

A pulverulent polymer composition which is readily pourable, has a low tendency to form dust and has good stability on storage is composed of a mixture of a vinyl ester polymer and a small proportion of a hydrophobic silica. The composition is prepared by spray drying an aqueous vinyl ester polymer dispersion in the presence of a hydrophobic silica. The silica is preferably a product from the reaction of a hydrophilic silica with an organochlorosilane. The composition can be redispersed in water and the films produced from such dispersions are transparent; they are suitable for the production of paints, glues and adhesives.

10 Claims, No Drawings

PULVERULENT POLYMER COMPOSITION, A PROCESS FOR ITS PREPARATION AND ADHESIVE BASED THEREON

The invention relates to a pulverulent polymer composition based on a water-dispersible vinyl ester polymer, a process for its preparation by spray drying an aqueous vinyl ester polymer dispersion in the presence of silica, and an adhesive based on said composition.

It is known that highly disperse silica is suitable for improving the pourability of pulverulent products, for example salts and waxes; the silica used in this way as a flow agent can be hydrophilic or hydrophobic (compare Seifen-Oele-Fette-Wachse 94 (1968), pages 849–858).

It is also known that dispersion powders which are pourable and can easily be redispersed are prepared by atomizing aqueous dispersions of vinyl acetate/ethylene copolymers in the presence of silica as an anticaking agent in a spray tower. In this process a silica having an average particle size of 0.01–0.5 $\mu$m is metered into the spray tower in an amount of 4 to 20 percent by weight (relative to the solids content of the dispersion), at the same time as the dispersion, but separated in space therefrom (compare German Pat. No. 2,214,410 corresponding to U.S. Pat. No. 3,883,489). A similar process using dispersions of copolymers formed from vinyl acetate and various comonomers as the starting material for spray drying is also described, silica being used in an amount of 2 to 20 percent by weight (relative to the solids content of the dispersion) as an anticaking agent (compare German Auslegeschrift No. 2,614,261 corresponding to British Pat. No. 1,569,637). These known dispersion powders have the disadvantage that they tend to form dust owing to the relatively high content of anticaking agent; also, when they are redispersed in water and the dispersion is dried, they produce films which are not transparent.

It is also known to prepare non-blocking, dispersible polymer powders by atomizing dispersions of homopolymers or copolymers which have a low second order transition temperature, inert substances being mixed into the powders, after drying, in such a quantity that the end product contains 5 to 20 percent thereof; suitable inert substances are aluminum silicate, kieselguhr, colloidal silica gel, clays, gypsum, fine silicates, talc, cements and diatomaceous earth (compare German Offenlegungsschrift No. 1,719,317 corresponding to British Pat. No. 1,206,501). It is emphasized that, if small quantities of the inert substance are used, its surface will be completely encased, so that there will not be an effective reduction in the tendency to form blocks.

The object of the invention is, therefore, to provide a polymer powder which is readily pourable, has a low tendency to form dust and good stability on storage and which can be dispersed in water and produces transparent films. The transparency of the films is of particular importance if the polymer is to be employed as a wallpaper adhesive.

The invention relates to a pulverulent polymer composition composed of 98.0 to 99.9 percent by weight of a water-dispersible vinyl ester polymer and 2.0 to 0.1 percent by weight of a hydrophobic silica.

The polymer composition according to the invention is preferably composed of 99.0 to 99.9% by weight of a water-dispersible vinyl ester polymer and 1.0 to 0.1 percent by weight of a hydrophobic silica.

The invention also relates to a process for the preparation of a pulverulent polymer composition, containing silica, based on a water-dispersible vinyl ester polymer, by spray drying an aqueous vinyl ester polymer dispersion having a solids content of 30 to 60 percent by weight, in the presence of silica, and comprises employing a hydrophobic silica in a quantity of 0.1 to 2.0 percent by weight (relative to the total quantity of vinyl ester polymer and silica).

The water-dispersible vinyl ester polymer which is used in accordance with the invention is preferably a homopolymer of a vinyl ester having 4, 5 or 6 carbon atoms, in particular polyvinyl acetate. Vinyl ester copolymers composed of two or three different monomers, in particular copolymers formed from vinyl acetate and at least one vinyl ester of a linear or branched carboxylic acid having 3 to 18 carbon atoms, preferably 3 to 12 carbon atoms, and also vinyl chloride and/or ethylene, are also suitable, however.

The starting material employed for the process of preparation according to the invention is an aqueous vinyl ester polymer dispersion which has a solids content of 30 to 60 percent by weight, preferably 40 to 55 percent by weight. The preparation of such dispersions is known, for example from the publications mentioned above.

An essential constituent of the polymer composition according to the invention is a hydrophobic silica, which is preferably a product from the reaction of a hydrophilic silica with an organochlorosilane. The particle diameter of the silica is preferably 10 to 50 nm, its surface area is 50 to 300 m$^2$/g (determined by the BET method) and its carbon content is 0.2 to 5, preferably 0.5 to 4, percent by weight. A 4% strength by weight aqueous suspension of the silica preferably has a pH value of 3.5 to 8.

The hydrophobic silica is prepared in a known manner (compare, for example, German Pat. No. 2,129,522 corresponding to U.S. Pat. No. 3,658,749 and German Pat. No. 1,172,245 corresponding to British Pat. No. 1,005,473).

For example, hydrophilic silicon dioxide is treated with an organohalogenosilane, preferably an organochlorosilane, which is employed in a quantity of 0.5 to 50 percent by weight, preferably 10 to 20 percent by weight (relative to the silicon dioxide). This treatment preferably consists in adding an organohalogenosilane at a temperature of 50° to 90° C. to precipitated silica in a suspended state, and, after the completion of the reaction, filtering off the product, washing and drying it and then heating it to a temperature of 300° to 400° C. Suitable organohalogenosilanes are, in particular, dialkyldihalogenosilanes, diaryldihalogenosilanes or alkylaryldihalogenosilanes having, preferably, 1 or 2 carbon atoms in each of the alkyl groups and, preferably, 6 carbon atoms in each of the aryl radicals, for example dimethyldichlorosilane, dimethyldibromosilane, diethyldichlorosilane, diphenyldichlorosilane and phenylmethyldichlorosilane.

In accordance with another process, silicon dioxide is rendered hydrophobic by treatment with a liquid, hydrophobic polyorganosiloxane. In this process, silicon dioxide particles obtained by precipitation are sprayed with a polyorganosiloxane and the sprayed particles are then heated at a temperature of at least 150° C. for 30 minutes to 3 hours. The polyorganosiloxane is employed in a quantity of 0.5 to 50 percent by weight, preferably 0.5 to 20 percent by weight (relative to the end product). Suitable polyorganosiloxanes are alkylsiloxanes, alicyclic siloxanes, aralkylsiloxanes and aralkylpolysiloxanes having, in each case, a kinematic viscosity of 0.1 to 30 m$^2$/second (measured at a temperature of 25° C.).

In accordance with a further process, silicon dioxide is rendered hydrophobic by dispersing it in a concentration of 2 to 10 percent by weight in a linear polymeric dimethylsiloxane (silicone oil) and then heating the resulting dispersion at a temperature of 250° to 300° C. for not longer than 1 hour. The mixture is cooled to room temperature and is then diluted with a solvent, such as hexane, and the hydrophobic silicon dioxide is isolated by centrifuging and, finally, dried.

The polymer composition according to the invention also contains, if appropriate, a customary protective colloid which has been employed in the preparation of the initial dispersion. Polyvinyl alcohol is particularly suitable, preferably a polyvinyl alcohol which has an ester number of 90 to 215 mg of KOH/g, a 4% strength by weight aqueous solution of which has a viscosity of 3 to 40 mPa.s at a temperature of 20° C. The quantity of the protective colloid can be up to 20 percent by weight and is preferably within the range from 5 to 15 percent by weight (relative to the vinyl ester polymer). Instead of a single protective colloid, it is also possible to use a mixture of different protective colloids.

The polymer composition according to the invention is prepared in a customary manner by spray drying an aqueous vinyl ester polymer dispersion. The spray drying is carried out in a drying tower with the aid of spinning disc atomizers or single-material nozzles or two-material nozzles. The dispersion is dried by means of a hot gas, for example nitrogen or air, which is blown into the tower. The temperature of the drying gas is 90° to 180° C., preferably 110° to 150° C. The silicon dioxide is introduced into the drying tower at the same time as the dispersion, but separated in space therefrom. The introduction is normally effected via two-material nozzles, located near the cover of the tower, or, preferably, as a mixture with the drying gas. The latter variant ensures a particularly uniform distribution of the silicon dioxide.

The polymer composition according to the invention is pulverulent, readily pourable, stable on storage and forms hardly any dust. The pourability of the polymer composition is tested by allowing it to run out of a measuring vessel similar to an hour glass and having a definite circular discharge orifice, and determining the smallest diameter of the discharge orifice through which the sample passes satisfactorily. A lower pourability is then given by a greater discharge orifice. The tendency of the polymer composition to form dust is tested by determining the dust index. This is done by allowing a 30 g sample of the polymer composition to fall through a cylindrical tube having a length of 80 cm and an internal diameter of 5 cm, in a black, cubical box, the sides of which are 20 cm long; the light from a 12 Volt lamp is passed through the box. The powder falling through the box causes a turbidity in the beam of light, which increases as the tendency of the powder to form dust increases. The dust index is calculated from the turbidity value; a product producing little dust gives a dust index of less than 40, preferably 5 to 35, whereas a dusty product gives a dust index of over 50.

The bulk density of the polymer composition according to the invention is within the range from 400 to 800 g/l, preferably 500 to 700 g/l. It is determined as specified in DIN 53,468. The tamped volume and the tamped weight of the polymer composition are determined after 250 tampings by a method modelled on DIN 53,194. The tamped volume is 75 to 98 percent, preferably 85 to 94 percent, while the tamped weight amounts to 500 to 900 g/l, preferably 550 to 800 g/l.

The polymer composition according to the invention can be converted, by stirring with water for a few minutes, into thick dispersions which have a stable viscosity and are stable on storage. Films produced from such dispersions are distinguished by a high transparency. The polymer composition is suitable for the production of paints, glues and adhesives, in particular wallpaper adhesives.

The invention is illustrated in greater detail by the examples which follow. Percentages relate in each case to weight.

EXAMPLE 1

An aqueous dispersion of polyvinyl acetate which had a solids content of 45 percent and a viscosity of 0.8 Pa.s (Epprecht-Rheometer B/II), was spray dried in a conventional spray tower, the cylindrical part of which had a height of 1 m and a diameter of 2.2 m, while the conical part had an angle of 60 degrees. The dispersion contained 8% (relative to the polyvinyl acetate) of a polyvinyl alcohol which had an ester number of 140 mg of KOH/g and the 4 percent strength aqueous solution of which had a viscosity of 18 mPa.s at 20° C., and also 4 percent (relative to the polyvinyl acetate) of a polyvinyl alcohol which had an ester number of 140 mg of KOH/g and the 4 percent aqueous solution of which had a viscosity of 8 mPa.s at 20° C. The dispersion was fed to the top of the tower and was atomized by means of a spinning disc atomizer which had a diameter of 12 cm and had 4 orifices, each of 2.5 mm diameter, and which rotated at a speed of 20,000 min$^{-1}$. A mixture of nitrogen and a hydrophobic silicon dioxide was blown, at a nitrogen throughput of 1,200 kg/h, into the tower through a further orifice in the cover of the tower. The nitrogen was removed via a cyclone separator. The temperature of the nitrogen was 135° C. at the tower inlet and 78° C. at the separator. The silicon dioxide had an average particle diameter of 28 nm, a surface area of 110 m$^2$/g and a carbon content of 2 percent; the pH value of a 4 percent strength aqueous suspension of the silicon dioxide was 7. The silicon dioxide was employed in a quantity of 0.5 percent (relative to the solids content of the polyvinyl acetate dispersion). Spray drying proceeded with complete absence of breakdowns for more than 2 days. A powder which was satisfactorily pourable at a discharge orifice of 2.5 mm diameter in the measuring vessel, formed little dust and was stable on storage and which had a dust index of 33, a bulk density of 550 g/l, a tamped volume of 86 percent and a tamped weight of 670 g/l, was obtained in a yield of 11 kg/h.

The silica-containing polyvinyl acetate powder was stirred with water to give a 50 percent strength dispersion of viscosity 5.0 Pa.s (Epprecht-Rheometer C/II). A transparent film was obtained when this dispersion was applied in a thickness of 300 μm to a black polyvinyl chloride film and was dried.

EXAMPLE 2

Example 1 was repeated, using a polyvinyl acetate dispersion which had a solids content of 43 percent and a viscosity of 0.25 Pa.s. This dispersion contained 6.5 percent of a polyvinyl alcohol which had an ester number of 90 mg of KOH/g and the 4 percent strength aqueous solution of which had a viscosity of 30 mPa.s at 20° C.

A powder which was satisfactorily pourable at a discharge orifice of 2.5 mm diameter in the measuring vessel, formed little dust and had a dust index of 25, a bulk density of 650 g/l, a tamped volume of 90 percent and a tamped weight of 740 g/l, was obtained after spray drying. The film obtained from the redispersed powder was transparent.

EXAMPLE 3

Example 1 was repeated, using a hydrophobic silicon dioxide having an average particle diameter of 16 nm, a surface area of 110 m$^2$/g and a carbon content of 1 percent; the pH value of a 4 percent strength suspension of the silicon dioxide was 4.

A powder which was satisfactorily pourable at a discharge orifice of 5 mm diameter in the measuring vessel, formed little dust and had a dust index of 29, a bulk density of 580 g/l, a tamped volume of 92 percent and a tamped weight of 640 g/l, was obtained after spray drying. The film obtained from the redispersed powder was transparent.

EXAMPLE 4

Example 1 was repeated, using a dispersion of a copolymer formed from 80 percent of vinyl acetate, 10 percent of ethylene and 10 percent of acrylamide, no polyvinyl alcohol being present; the dispersion had a solids content of 45 percent and a viscosity of 0.6 Pa.s. The silicon dioxide was employed in a quantity of 0.6 percent.

A powder which was satisfactorily pourable at a discharge orifice of 2.5 mm diameter in the measuring vessel, formed little dust and had a dust index of 33, a bulk density of 502 g/l, a tamped volume of 87 percent and a tamped weight of 577 g/l, was obtained after spray drying. The film otained from the redispersed powder was transparent.

COMPARISON EXAMPLE 1

Example 1 was repeated, but without using silicon dioxide.

After 6 hours it was necessary to discontinue spray drying owing to severe caking and blockages in the tower. The powder obtained was difficult to pour (did not flow at a measuring vessel orifice of 20 mm diameter), formed little dust and had a dust index of 28, a bulk density of 620 g/l, a tamped volume of 88 percent and a tamped weight of 730 g/l. The powder could not be redispersed satisfactorily.

COMPARISON EXAMPLE 2

Example 1 was repeated, using a hydrophilic silicon dioxide which had an average particle diameter of 18 nm, a surface area of 190 m$^2$/g and a carbon content of 0 percent; the pH value of a 4 percent strength suspension of the silicon dioxide was 6.3. The silicon dioxide was employed in a quantity of 1 percent.

After 10 hours it was necessary to discontinue spray drying owing to caking and blockages in the tower. The powder obtained was difficult to pour, since it did not run out until the orifice of the measuring vessel had a diameter of 18 mm, and it formed little dust; it had a dust index of 31, a bulk density of 570 g/l, a tamped volume of 87 percent and a tamped weight of 670 g/l. The film obtained from the redispersed powder was transparent.

COMPARISON EXAMPLE 3

Comparison Example 2 was repeated, employing the silicon dioxide in a quantity of 5 percent. A powder which was pourable at a discharge orifice of 5 mm diameter in the measuring vessel, but which formed dust and had a dust index of 55, a bulk density of 520 g/l, a tamped volume of 91 percent and a tamped weight of 590 g/l, was obtained after spray drying. The film obtained from the redispersed powder was cloudy.

We claim:

1. A pulverulent polymer composition obtained by spray drying of an aqueous polymer dispersion in the presence of a hydrophobic silica comprising 98.0 to 99.9 percent by weight of a water-dispersible vinyl ester polymer and 2.0 to 0.1 percent by weight of a hydrophobic silica, said vinyl ester polymer being a homopolymer of a vinyl ester having four, five or six carbon atoms or said vinyl ester polymer being a vinyl ester copolymer comprising a copolymer of vinyl acetate and a vinyl ester of a carboxylic acid having three to eighteen carbon atoms, a vinyl chloride or an ethylene.

2. A polymer composition as claimed in claim 1 wherein the vinyl polyester polymer is a vinyl acetate homopolymer.

3. A polymer composition as claimed in claim 1, wherein the hydrophobic silica is a product from the reaction of silica with an organochlorosilane.

4. A polymer composition as claimed in claim 1, wherein the hydrophobic silica has a particle diameter of 10 to 50 nm.

5. A polymer composition as claimed in claim 1, wherein the hydrophobic silica has a surface area of 80 to 300 m$^2$/g.

6. A polymer composition as claimed in claim 1, wherein the hydrophobic silica has a carbon content of 0.2 to 5 percent by weight.

7. A process for the preparation of a pulverulent, silica-containing polymer composition based on a water-dispersible vinyl ester polymer, which comprises spray drying an aqueous vinyl ester polymer dispersion having a solids content of 30 to 60 percent by weight, said vinyl ester polymer being a homopolymer of a vinyl ester having four, five or six carbon atoms or said vinyl ester polymer being a vinyl ester copolymer comprising a copolymer of vinyl acetate and a vinyl ester of a carboxylic acid having three to eighteen carbon atoms, a vinyl chloride or an ethylene, in the presence of a hydrophobic silica in a quantity of 0.1 to 2.0 percent by weight.

8. A process as claimed in claim 7, wherein the silica is employed in admixture with a drying gas.

9. An adhesive composition consisting essentially of an aqueous dispersion including the polymer composition according to claim 1.

10. A pulverulent polymer composition, as claimed in claim 1, comprising a spray dried composition of 98.0 to 99.9 percent by weight of a water-dispersible vinyl ester polymer and 2.0 to 0.1 percent by weight of a hydrophobic silica, said vinyl ester polymer being a homopolymer of a vinyl ester having four, five or six carbon atoms or said vinyl ester polymer being a vinyl ester copolymer comprising a copolymer of vinyl acetate and a vinyl ester of a carboxylic acid having three to eighteen carbon atoms, a vinyl chloride or an ethylene, wherein the hydrophobic silica has a particle diameter of 10 to 50 nm, a surface area of 80 to 300 m$^2$/g and a carbon content of 0.2 to 5 percent by weight.

* * * * *